United States Patent Office 3,560,422
Patented Feb. 2, 1971

3,560,422
FAST TACK FORMULATION
Eugene R. Cox, Ponca City, Okla., assignor to Continental Oil Co., Ponca City, Okla., a corporation of Delaware
No Drawing. Filed Nov. 8, 1967, Ser. No. 681,580
Int. Cl. C08f 45/52
U.S. Cl. 260—28.5          1 Claim

ABSTRACT OF THE DISCLOSURE

Wax composition, having superior fast tack, comprising paraffin wax, ethylene-vinyl acetate copolymer, α-methyl styrene-vinyl toluene copolymer, and terpolymer of α-methyl styrene, vinyl toluene, and ethylhexyl acrylate.

DISCLOSURE

Background

Many types of materials have been used for the packaging of foodstuffs. Heretofore, a material such as "Saran" coated glassine has been used for the packaging of foodstuffs, such as potato chips, corn chips, dehydrated foods and the like. While this material is satisfactory, it has the disadvantage of being relatively expensive.

One of the requirements which must be met in a composition used for coating glassine, which is to be used as described above, is that the composition have a "fast tack." The term "fast tack," which is well known to those in the packaging art, refers to the ability of the composition on the package to seal in a short weld time. Fast tack is necessary for high speed operation of packaging machines.

In an attempt to develop a coating composition for glassine and the like, which composition is less expensive than "Saran," attention has been directed to wax-containing compositions, and particularly compositions containing wax and ethylene-vinyl acetate copolymers. While several advantages exist with the wax/ethylene-vinyl acetate copolymer compositions, the compositions have a disadvantage of not having superior fast tack performance. Unexpectedly, I have discovered a composition containing wax and a wax-extendible copolymer, such as ethylene-vinyl acetate copolymer, which possesses superior fast tack.

Prior art

Pertinent prior art developed by a search includes the following patents:

U.S. 3,205,186, to Zaayenga, teaches a coating composition containing a major proportion of paraffin wax and minor proportions of polyolefin wax and an ethylene/vinyl acetate copolymer.

U.S. 3,215,657, to Beresniewicz, teaches wax-ethylene terpolymer compositions. An example of a terpolymer of this patent is that of ethylene/ethyl acrylate/methacrylic acid.

U.S. 3,245,931, to Matthews, teaches a wax-containing composition having satisfactory hot tack properties. The composition consists essentially of (1) 25–40% of an ethylene/vinyl acetate copolymer having a melt index of 1 to 10, (2) 12–20% of an α-methyl styrene/vinyl toluene copolymer, and (3) 40–63% of petroleum wax. The patent teaches that all three components must be present in the amounts specified.

U.S. 3,294,722, to Apikos et al., teaches a wax coating composition comprising paraffin wax, microcrystalline wax, ethylene/vinyl acetate copolymer, and low molecular weight oily polymers of styrene.

In addition to the preceding patents, I wish to mention application Ser. No. 487,051, filed Sept. 15, 1965, now U.S. 3,396,134, of which I am also the inventor. The application concerns a wax composition, having superior fast tack properties, comprising wax, ethylene/vinyl acetate copolymer α-methyl styrene/vinyl toluene copolymer and butyl rubber.

Objects and description of invention

It is an object of the present invention to provide a superior composition for coating glassine and the like.

It is another object of the present invention to provide a composition for coating glassine and the like, which composition has superior fast tack properties.

It is still another object of the present invention to provide an improved method of preparing coated glassine paper wherein the method comprises the use of a composition as described herein, having a superior fast tack property.

Broadly stated, the present invention relates to a highly viscous wax composition, having superior fast tack properties and being particularly useful for coating glassine, paper and the like, which comprises in parts by weight:

| | |
|---|---|
| Petroleum wax | 25–50 |
| Ethylene-vinyl acetate copolymer | 24–44 |
| α-Methyl styrene-vinyl toluene copolymer | 15–30 |
| Terpolymer of α-methyl styrene, vinyl toluene, and ethylhexyl acrylate | 1–25 |

A preferred composition of the present invention comprises, in parts by weight:

| | |
|---|---|
| Paraffin wax | 25–50 |
| Ethylene-vinyl acetate copolymer containing 16–34% (weight) vinyl acetate and having a melt index of about 1 to about 3 | 12–22 |
| Ethylene-vinyl acetate copolymer containing 16–34% (weight) vinyl acetate and having a melt index of about 5 to about 7 | 12–22 |
| α-Methyl styrene-vinyl toluene copolymer having a ring-and-ball melting point of about 100 to about 130° C | 15–30 |
| Terpolymer of α-methyl styrene, vinyl toluene and ethylhexyl acrylate | 1–25 |

More preferably, the composition of the present invention comprises, in parts by weight:

| | |
|---|---|
| Paraffin wax | 30–40 |
| Ethylene-vinyl acetate copolymer containing 24–30% (weight) vinyl acetate and having a melt index of about 1 to about 3 | 15–19 |
| Ethylene-vinyl acetate copolymer containing 24–30% (weight) vinyl acetate and having a melt index of about 5 to about 7 | 15–19 |
| α-Methyl styrene-vinyl toluene copolymer having a ring-and-ball melting point of about 100 to about 130° C | 18–28 |
| Terpolymer of α-methyl styrene, vinyl toluene and ethylhexyl acrylate | 3–10 |

In one aspect, the invention relates to an improved method of coating glassine paper, said method comprising using the above-described composition.

Detailed description

The term "petroleum wax" as used herein refers to paraffin wax, microcrystalline wax or mixtures thereof.

The term "paraffin wax" is used to define the hard, crystalline wax commonly obtained from petroleum distillates, derived from mineral oils of the mixed-base or paraffin-base type. By the present refining method, crude petroleum oil is subjected to distillation whereby it is separated into a series of fractions known as "paraffin distillates." The wax is separated from the paraffin distillate by chilling and filtering or by the use of a solvent, as for example, propane or a ketone such as methyl ethyl ketone. The wax obtained by either of these two methods contains from 10 to 50 percent oil and is generally referred to as "slack wax." This slack wax is subjected to a "sweating operation" to remove the oil. By proper sweating the oil content may be reduced to less than 1 percent. Also, the oil content may be reduced to an acceptable value by other methods such as solvent deoiling or press deoiling. The final product is known as "refined wax" or "paraffin wax" and is graded according to the tensile strength, melting point, oil content, hardness, etc. Preferably, the paraffin waxes used in my composition have an ASTM melting point in the range of about 125 to about 160° F., and have an oil content of about 1 percent or less.

The paraffin waxes are preferred for use in my composition.

The term "microcrystalline wax" refers to a wax material which is obtained usually from the residual product of the vacuum distillation of lubricating oils. In general, microcrystalline waxes contain only very minor quantities of straight chain paraffinic hydrocarbons. For additional information concerning the properties and preparation of microcrystalline waxes, we refer to U.S. Patent No. 2,983,664 by Concetto T. Camilli. Preferably, the microcrystalline waxes used in my composition have an ASTM melting point in the range of about 125 to about 190° F.

Ethylene-vinyl acetate copolymers are prepared by copolymerizing a mixture of ethylene and vinyl acetate in the presence of a free radical catalyst, e.g., tertiary butyl hydroperoxide, in a suitable reactor at elevated temperatures and pressures. The copolymers are usually identified by a combination of the ratios of the co-monomers present in the product and by the melt index. The test for determining melt index (ASTM D–1238–57T) consists of determining the amount in grams (melt index value) of the copolymer that can be pressed through a standard orifice in ten minutes at 190° C. with a piston weighing 2160 grams. Suitable ethylene-vinyl acetate copolymers for use in my invention contain from about 66 to about 84 percent ethylene (by weight) and from about 16 to about 34 percent vinyl acetate (by weight) and have melt indexes in the range of from about 1 to about 7. Preferably, the ethylene-vinyl acetate copolymers used in my invention contain from about 70 to about 76 percent ethylene (by weight) and from about 24 to about 30 percent vinyl acetate (by weight) and have melt indexes in the range of from about 1 to about 7.

Ethylene-vinyl acetate copolymers are available in commercial quantities from E. I. du Pont de Nemours and Co., Inc. and are sold under the "Elvax" trademark. Properties of various "Elvax" copolymers are as follows:

It is of interest that I have found that compositions containing a mixture of ethylene-vinyl acetate copolymers have superior properties when coating glassine, as compared to compositions containing a single ethylene-vinyl acetate copolymer. More particularly, I have found that a mixture of ethylene-vinyl acetate copolymer, wherein one has a melt index in the range of about 1 to about 3 and wherein the other has a melt index in the range of about 5 to about 7, gives improved results. For this reason, a mixture of the hereinbefore defined copolymers is preferred in my invention.

The α-methyl styrene-vinyl toluene copolymers which are used in the composition of my invention contain from about 25 to about 35 percent (by weight) alphamethyl styrene and from about 75 to about 65 percent (by weight) vinyl toluene. The suitable copolymers have a ball-and-ring softening point in the range of about 100° C. to about 130° C. Preferably, the copolymer has a ball-and-ring softening point of about 120° C. These copolymers are described more completely in U.S. Pat. No. 3,000,868, which is made a part of this disclosure. The materials are available commercially from the Pennsylvania Industrial Chemical Corp. under the trademark "Piccotex." Typical properties of two grades of "Piccotex" are shown below.

|  | Piccotex 100 | Piccotex 120 |
|---|---|---|
| Softening point, ball-and-ring, ° C | 100 | 120 |
| Color, Gardner Scale (maximum) | 1 | 1 |
| Specific gravity | 1.04 | 1.04 |
| Pounds per gal., solid resin | 8.67 | 8.67 |
| Gardner viscosity, in toluene at 25° C | (¹) | (²) |
| Gardner viscosity, in 55% mineral spirits |  | T–V |
| Acid number, less than | 1 | 1 |
| Saponification No., less than | 1 | 1 |
| Bromine No., (electrometric) less than | 1 | 1 |
| Ash, less than—, percent | 0.1 | 0.1 |
| Refractive index at 25° C | 1,583 | 1,583 |
| Ozone No | 0 | 0 |
| Flash point, ° F | 500 | 500 |
| Fire point, ° F | 550 | 550 |

¹ Q at 70% solids.
² L at 65% solids.

The terpolymer used in my composition suitably contains from about 20 to about 50 parts α-methyl styrene, from about 45 to about 80 parts vinyl toluene, and from about 0.5 to about 10 parts ethylhexyl acrylate. More suitably, the terpolymer contains from about 25 to about 40 parts α-methyl styrene, from about 55 to about 75 parts vinyl toluene, and from about 0.75 to about 5 parts ethylhexyl acrylate. Preferably, the terpolymer contains from about 31 to about 36 parts α-methyl styrene, from about 63 to about 67 parts vinyl toluene, and from about 1 to about 2 parts ethylhexyl acrylate. (In the preceding all parts are by weight).

Terpolymers of α-methyl styrene, vinyl toluene and ethylhexyl acrylate are available commercially from Reichhold Chemicals, Inc. under the "Alphaprene" A trademark. Properties of various "Alphaprene" A terpolymers are as follows:

| Property | Elvax 360 | Elvax 260 | Elvax 250 | Elavx 240 | Elvax 220 | Elvax 150 |
|---|---|---|---|---|---|---|
| Co-monomer ratios: |  |  |  |  |  |  |
| Percent ethylene | 76–74 | 73–71 | 73–71 | 73–71 | 73–71 | 78–72 |
| Percent vinyl acetate | 24–26 | 27–29 | 27–29 | 27–29 | 27–29 | 22–28 |
| Melt index ¹ | 1–3 | 5–7 | 12–18 | 22–28 | 125–127 | 32–34 |
| Density at 23° C | .95 | .954 | .951 | .951 | .949 | .957 |
| Refractive index 25° C. D line | 1,491 | 1,485 | 1,485 | 1,485 | 1,485 | 1,482 |
| Softening point, ring-and-ball, ° F | 370 | 310 | 280 | 250 | 192 | 243 |

¹ The melt index is determined by ASTM method No. D–1238–57T.

|  | 100 | 115 | 120 |
|---|---|---|---|
| Softening point, R and B, ° C | 100 | 115 | 120 |
| Color | (¹) | (¹) | (¹) |
| Specific gravity | 1.04 | 1.04 | 1.04 |
| Pounds per gallon solid | 8.632 | 8.632 | 9.632 |
| Gardner viscosity: |  |  |  |
| 50% in M.S | T | V–W | X–Y |
| 60% in M.S | Z₂–Z₃ | Z₄–Z₅ | Z₆–Z₇ |
| Acid number | 0.0 | 0.0 | 0.0 |
| Saponification No | 0.0 | 0.0 | 0.0 |
| Bromine No | 0.0 | 0.0 | 0.0 |
| Ash, percent less than | 0.05 | 0.05 | 0.05 |
| Flash point, ° F | 500 | 500 | 500 |
| Fire point, ° F | 550 | 550 | 550 |

¹ Water white.

Terpolymers having the above properties are preferred in my composition with terpolymers having the properties of "Alphaprene" A–120 being particularly preferred.

In order to disclose the nature of the present invention still more clearly, the following illustrative examples will be given, in which parts used are parts by weight.

EXAMPLES

The compositions used in these examples were applied to glassine paper using a laboratory coater. The compositions were applied at coating weights in the range of 9 to 11 pounds per ream. The laboratory coater consisted of a rotating hot applicator roll, which was immersed in the composition, and a metering knife. The glassine paper was pulled through the coater manually, first kissing the applicator roll and then going through the metering station where the coating was doctored to the desired coating weight. Coating weights were controlled by the speed of travel over the doctor knife, pressure on the paper in the metering station, and viscosity and temperature of the blend.

The glassine paper used in these examples was commercial production from Rhinelander Paper Co., Rhinelander, Wis.

The test procedure used for measuring hot tack was as follows:

The test employs a spring tester which is cut from 0.007 inch spring steel sheet. The testers are 8 inches long and 3 inches in width at each end. Starting at about 1 inch from both ends the testers narrow circumferentially (i.e., concave viewed from the side) so that the center of the tester is only about $11/32$ inch to about $16/32$ inch wide. The strength of the tester is dependent on this width at the center. When used to measure hot tack, the tester is flexed end-to-end. An Instron Tester is used to calibrate the spring tester.

Samples of coated material cut 3 inches wide by about 14 inches long are sealed coating-to-coating in the form of a loop. This seal is made to join the two ends of the strip into a loop. It is allowed to cool in the normal manner so that a firm bond is formed. The spring tester described above is then inserted, flexed by hand inside the loop, and a second heat seal made adjacent to the end of the flexed spring tester. (All test seals were made at a jaw pressure of 30 p.s.i.g., a dwell time of 1 second and at the minimum temperature which was found to produce a paper tearing seal with the coating under test.) Hand pressure is removed from the spring tester during the dwell period so that it is free to exert its full parting force when the heat seal jaw is lifted. At this moment, the spring tends to pull apart while the bond is hot, and thus provides a measure of "hot tack." Spring testers of differing strength are used in the test.

Using the technique described above, the following composition was tested.

| | Parts by weight |
|---|---|
| Ethylene-vinyl acetate copolymer-A [1] | 17.5 |
| Ethylene-vinyl acetate copolymer-B [2] | 17.5 |
| α-Methyl styrene-vinyl toluene copolymer [3] | 25 |
| α-Methyl styrene-vinyl toluene-ethylhexyl acrylate terpolymer [4] | 5 |
| Paraffin wax [5] | 35 |

[1] "Elvax" 260.
[2] "Elvax" 360.
[3] "Piccotex" 120.
[4] "Alphaprene" A–120.
[5] Having an ASTM melting point of 143–150° F.

The following spring test results were obtained:

| Spring: | Seal |
|---|---|
| 0.62 oz./inch | Total. |
| 0.68 oz./inch | Total. |
| 1.16 oz./inch | Borderline. |

The above results demonstrate that the composition of my invention possesses superior fast tack properties.

While particular embodiments of the invention have been described, it will be understood, of course, that the invention is not limited thereto, since many modifications may be made; and it is, therefore, contemplated to cover by the appended claim any such modifications as fall within the true spirit and scope of the invention.

The invention having thus been described, what is claimed and desired to be secured by Letters Patent is:

1. A wax composition, suitable for coating of paper and having superior fast tack, said composition comprising in parts by weight:
   (a) 35 parts paraffin wax having an ASTM melting point of 143 to 150° F.,
   (b) 17.5 parts ethylene-vinyl acetate copolymer having a melt index of about 1 to about 3.
   (c) 17.5 parts ethylene-vinyl acetate copolymer having a melt index of about 5 to about 7,
   (d) 25 parts α-methyl styrene-vinyl toluene copolymer, containing about 25 to about 35 weight percent α-methyl styrene and having a ring-and-ball melting point of about 100 to about 130° C., and
   (e) 5 parts of a terpolymer which contains about 31 to about 36 parts by weight α-methyl styrene, about 63 to about 67 parts by weight vinyl toluene and about 1 to about 2 parts by weight ethylhexyl acrylate.

References Cited

UNITED STATES PATENTS

| 3,245,931 | 4/1966 | Matthew | 260—28.5AV |
| 3,427,275 | 2/1969 | Davis | 260—80.78 |

MORRIS LIEBMAN, Primary Examiner

P. R. MICHL, Assistant Examiner

U.S. Cl. X.R.

260—897